(12) United States Patent
Ursel et al.

(10) Patent No.: US 6,906,438 B2
(45) Date of Patent: Jun. 14, 2005

(54) ELECTRICAL DRIVE UNIT

(75) Inventors: Eckhard Ursel, Buehl (DE); Walter Haussecker, Buehlertal (DE); Robert Hessdoerfer, Ottersweier Breithurst (DE)

(73) Assignee: Robert Bosch GmbH, Stuttgart (DE)

( * ) Notice: Subject to any disclaimer, the term of this patent is extended or adjusted under 35 U.S.C. 154(b) by 220 days.

(21) Appl. No.: 10/312,168

(22) PCT Filed: Jun. 20, 2001

(86) PCT No.: PCT/DE01/02314
§ 371 (c)(1),
(2), (4) Date: Dec. 20, 2002

(87) PCT Pub. No.: WO01/99259
PCT Pub. Date: Dec. 27, 2001

(65) Prior Publication Data
US 2004/0012279 A1 Jan. 22, 2004

(30) Foreign Application Priority Data
Jun. 21, 2000 (DE) .......................................... 100 29 452

(51) Int. Cl.$^7$ ................................................. H02K 5/10
(52) U.S. Cl. .............................. 310/89; 310/71; 310/83
(58) Field of Search .............................. 310/85–89, 71, 310/83

(56) References Cited

U.S. PATENT DOCUMENTS

| 4,398,135 | A | * | 8/1983 | Busch et al. ................. 318/443 |
| 5,053,664 | A | * | 10/1991 | Kikuta et al. ................. 310/114 |
| 5,063,317 | A | * | 11/1991 | Bruhn ............................ 310/91 |
| 5,166,677 | A | * | 11/1992 | Schoenberg ............. 340/853.3 |
| 5,382,857 | A | * | 1/1995 | Schellhorn et al. ........... 310/83 |
| 5,528,093 | A |   | 6/1996 | Adam et al. ................... 310/89 |
| 5,923,094 | A | * | 7/1999 | Seeberger et al. ........... 307/9.1 |
| 6,107,713 | A | * | 8/2000 | Hulsmann et al. ........ 310/75 R |
| 6,317,332 | B1 | * | 11/2001 | Weber et al. ................ 361/760 |
| 6,459,183 | B1 | * | 10/2002 | Tasch et al. ................... 310/89 |
| 6,710,484 | B2 | * | 3/2004 | Kitoh et al. ................... 310/83 |

FOREIGN PATENT DOCUMENTS

| DE | 38 38 285 A | 5/1990 |
| DE | 43 37 390 A | 4/1995 |
| DE | 197 10 015 A | 9/1998 |
| DE | 198 39 333 C1 | 1/2000 |
| EP | 0 538 495 A1 | 4/1993 |
| EP | 0 865 148 A | 9/1998 |

* cited by examiner

Primary Examiner—Dang Le
(74) Attorney, Agent, or Firm—Michael J. Striker

(57) ABSTRACT

A drive unit (6) has a sealed electronics housing (3) and motor housing (13). The signal receiver (37) is disposed on the brush holder (7) in the motor housing (13) or transmission housing (28). The design of a printed circuit board (49) can therefore be embodied in a simple fashion.

7 Claims, 1 Drawing Sheet

ELECTRICAL DRIVE UNIT

BACKGROUND OF THE INVENTION

The invention is based on an electric drive unit.

EP 538 495 A1 has described an electromotive power-window drive in which an electronics housing is slid onto a transmission housing. The electronics housing and the transmission housing are open at this junction point and must be sealed.

DE 198 39 333 C1 has disclosed a drive unit in which a sealed electronics housing is mounted onto a sealed transmission housing. The Hall sensors in this case are disposed on a printed circuit board in the electronics housing.

SUMMARY OF THE INVENTION

The electric drive unit according to the invention has the advantage over the prior art that an electronics housing, which can be designed to client specifications, can be simply dispose on an electric drive unit, which is for the most part comprised of standard housings, such as the motor housing and the transmission housing.

The electronics housing is advantageously disposed on a plug because this means that only the plug has to be adapted to the client-specific requirements in terms of its plug shape and/or number of plug contacts.

Hall sensors are advantageously used for the signal receivers for rotation detection.

The electronics housing can advantageously be fastened to the plug/brush holder in both the radial and axial direction, which permits the installation direction of the electronics housing to be adapted to the respective external conditions.

BRIEF DESCRIPTION OF THE DRAWINGS

An exemplary embodiment of the invention is shown in a simplified fashion in the drawings and will be explained in detail in the description that follows.

FIG. 1b shows a view of an electric drive unit embodied according to the invention, in the viewing direction B indicated in FIG. 1a.

DESCRIPTION OF THE PREFERRED EMBODIMENTS

Figure 1A:
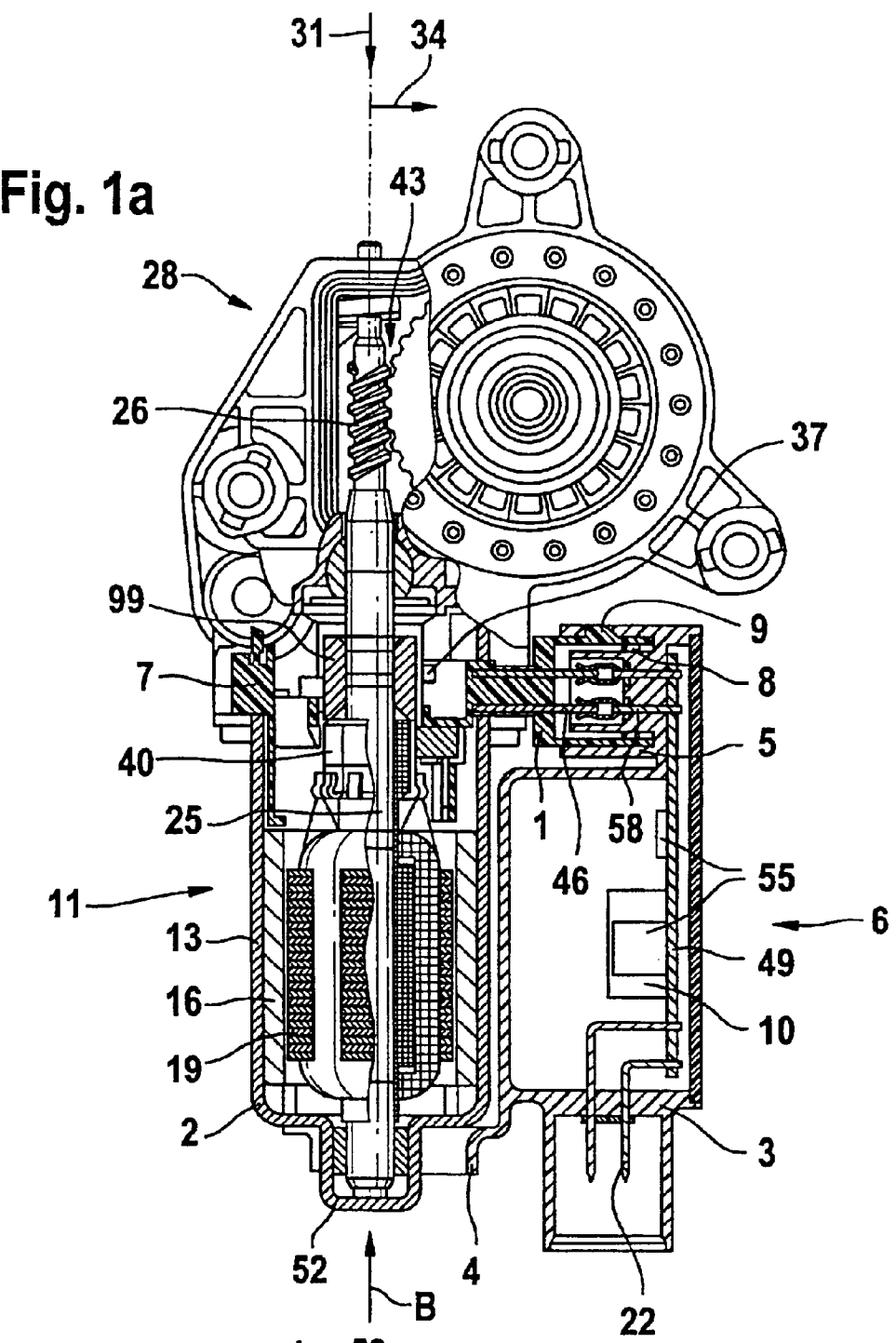
FIG. 1a shows a partially sectional view of an electric drive unit.

FIG. 1a shows an electric drive unit 6 embodied according to the invention, for example for use as a power-window motor-and-gear assembly.

The electric drive unit 6 is comprised of at least an electric motor 11, a transmission 43, and a set of motor electronics 10.

An electric commutator motor, as an example for an electric motor 11, is comprised of at least a commutator 40, a motor housing 13, which is embodied e.g. as a pole tube or as a pole cup 2 and serves as a magnetic yoke element, and magnets 16 disposed on the motor housing 13.

The electric drive unit 6 has a rotor shaft 25, which protrudes from the motor housing 13 into a transmission housing 28 and is correspondingly supported, for example, in the motor housing 13 and in the transmission housing 28.

A lamination bundle 19, which supports a winding, is disposed on the rotor shaft 25 in the vicinity of the magnets 16.

At the axial end of the rotor shaft 25 opposite from the electric motor 11, there is a gearing 26 that meshes reciprocally with a gearing of the transmission 43.

The transmission 43 and the gearing 26 are disposed in the transmission housing 28.

A brush holder 7 is disposed between the motor housing 13 and at least part of the transmission housing 28. The brush holder 7 is provided with at least one signal receiver 37, e.g. in the form of Hall sensors, for detecting rotation of the rotor shaft 25, for example the speed or rotation direction. The rotor shaft 25 correspondingly supports a signal transmitter, e.g. in the form of an annular magnet 99.

A plug 1 with plug contacts 46 is provided on the brush holder 7, for example of one piece with it, and protrudes e.g. at least partially out from the transmission housing 28. For example, the plug contacts 46 are cast into the plug 1 and extend in the brush holder 7.

The motor housing 13, the brush holder 7, and the transmission housing 28 are connected to each other, i.e. they are disposed snugly against one another and are therefore water-tight.

The electric drive unit 6 also has a tightly sealed electronics housing 3, which has a counterpart plug 5 that fits the plug 1. By means of a fixing device 9, for example in the form of detent elements, the counterpart plug 5 of the electronics housing 3 is attached to the plug 1, which in this instance is of one piece with the brush holder 7.

A sealing element 8 is disposed between the plug 1 and the counterpart plug 5, which protects the plug contacts 46 from moisture.

The motor electronics 10 are disposed inside the electronics housing 3. The motor electronics 10 are comprised, for example, of at least one printed circuit board 49 with different electrical and/or electronic components 55. The printed circuit board 49 likewise has plug elements 58, which convey the electric control signals and/or the power supply to the electric motor 11.

For example, the plug contacts 58 are also cast into the electronics housing 3 and are thus sealed in a water-tight fashion in relation to the outside.

The electronics housing 3 also has an electronics housing plug connector 22, which is used to produce an external connection to an electrical energy supply.

In this example, the electronics housing 3 has been slid onto the brush holder 7 in the radial direction 34. However, the plug 1 on the brush holder 7 can also be embodied so that the electronics housing 3 can be slid on in the axial direction 31.

Figure 1B:
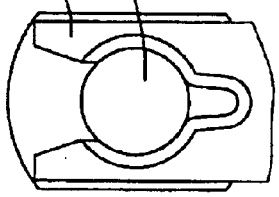

FIG. 1b shows a partial view in the axial direction of the electric drive unit 6.

For example, the electronics housing 3 has at least one clamp 4 by means of which it is slid onto and fastened to a bearing bush receptacle 52 at the axial end of the motor housing 13. The attachment can also be embodied differently and can also be provided on the plug 1, for example.

What is claimed is:

1. An electric drive unit, comprising:
   a drive housing;
   a motor housing;
   a separately formed, attachable electronics housing;
   a brush holder, wherein on the brush holder, at least one signal receiver for rotation detection is mounted, and the brush holder is connected with the motor housing and the drive housing in a water-tight fashion, and on the brush holder, a plug with plug contacts is formed as one piece, and wherein the electronics housing is sealingly closed when separate and has a counter plug adapted to the plug.

2. The electric drive unit according to claim 1, wherein the electronics housing is sealed in a water-tight fashion when separate.

3. The electric drive unit according to claim 1, wherein the signal receiver is a Hall sensor.

4. The electric drive unit according to claim 1, wherein the electronics housing is attachable to a plug in a radial direction.

5. The electric drive unit according to claim 1, wherein the electronics housing is attachable to a plug in an axial direction.

6. The electric drive unit according to claim 1, further comprising a set of electronics, wherein the brush holder has plug contacts, wherein the plug contacts are electrically connected to said set of electronics.

7. The electric drive unit according to claim 6, wherein the electronics are disposed in said electronics housing, wherein said electronics housing has plug elements, wherein said plug elements are electrically connectable to said plug contacts.

* * * * *